United States Patent [19]

Sugata

[11] Patent Number: 5,706,116
[45] Date of Patent: Jan. 6, 1998

[54] DRIVE CIRCUIT OPTICAL MODULATOR AND OPTICAL TRANSMITTER

[75] Inventor: Akihiko Sugata, Kawaski, Japan

[73] Assignee: Fujitsu Limited, Kawasaki, Japan

[21] Appl. No.: 710,556

[22] Filed: Sep. 19, 1996

[30] Foreign Application Priority Data

Dec. 26, 1995 [JP] Japan .................. 7-339481

[51] Int. Cl.[6] .................................................. H04B 10/04
[52] U.S. Cl. ...................... 359/180; 359/181; 359/245; 372/38; 385/2
[58] Field of Search ................... 359/180–181, 359/188, 173, 245, 187, 161; 372/38; 385/1–3

[56]         References Cited

U.S. PATENT DOCUMENTS

| 5,359,449 | 10/1994 | Nishimoto et al. ........... 359/181 |
| 5,394,260 | 2/1995 | Suzuki et al. .................. 359/180 |
| 5,434,693 | 7/1995 | Tanaka et al. ................. 359/180 |
| 5,608,561 | 3/1997 | Marcuse et al. ............... 359/161 |

*Primary Examiner*—Knife-Michael Negash
*Attorney, Agent, or Firm*—Staas & Halsey

[57]           ABSTRACT

A drive circuit for an optical modulator having first and second electrodes for receiving a drive voltage. The optical modulator modulates carrier light from a light source according to the drive voltage to output modulated signal light. A terminating resistor for generating the drive voltage is connected between the first and second electrodes. A first end of a transmission line is connected to one of the first and second electrodes. A circuit for generating a drive signal is connected to a second end of the transmission line. A reflection rejecter (e.g., attenuator) for suppressing a reflected wave generating in the transmission line is provided on the transmission line. This drive circuit improves the waveform of the modulated signal light in case that the carrier light has large power.

12 Claims, 10 Drawing Sheets

DRIVE CIRCUIT OPTICAL MODULATOR AND OPTICAL TRANSMITTER

BACKGROUND OF THE INVENTION

1. Field of the Invention

The present invention relates generally to driving of an optical modulator and its application, and more particularly to an optical modulator drive circuit fit for an electro-absorption type of optical modulator and an optical transmitter to which the drive circuit is applied.

2. Description of the Related Art

In an optical fiber communication system, a modulation speed is increasing with an increase in capacity of a transmission line. In direct intensity modulation of a laser diode, relatively large wavelength chirping limits a transmission distance and a modulation speed. When signal light with chirping is passed through an optical fiber having chromatic dispersion (wavelength dispersion), waveform distortion usually occurs. To avoid this problem, it has increasingly been expected to use an external optical modulator which hardly generates chirping.

As a practical external optical modulator, there has been developed a Mach-Zehnder type of optical modulator (MZ modulator) using a LiNbO3 substrate. Carrier light having a constant intensity is supplied from a light source to the MZ modulator, and intensity-modulated signal light is obtained by a switching operation using interference of light. Frequently pointed-out drawbacks of the MZ modulator include requirement of a relatively large drive voltage and requirement of automatic bias control for maintaining an operation point constant, which causes a tendency to increase in scale of the device.

In view of these drawbacks, there has been proposed an electro-absorption type of optical modulator (EA modulator) as an external optical modulator which can be driven by lower electric power and is fit for a size reduction. The EA modulator absorbs carrier light according to a drive voltage to thereby generate intensity-modulated signal light. A practical EA modulator is provided as a semiconductor chip by a semiconductor layering technique. This semiconductor chip can be easily integrated with a laser diode as a light source, thereby allowing provision of a small-sized optical transmitter with lower coupling loss.

In driving an EA modulator, carrier light having large power must be supplied to the EA modulator in order to obtain an optical output having large power. However, it has become apparent that the supply of the carrier light having large power causes a degradation in waveform of an optical modulated signal, thus reducing a transmission quality.

SUMMARY OF THE INVENTION

It is therefore an object of the present invention to provide a drive circuit for an optical modulator which can suppress the waveform degradation to the carrier light having large power.

It is another object of the present invention to apply such a drive circuit to an optical transmitter.

The drive circuit according to the present invention is applicable to an optical modulator having first and second electrodes for receiving a drive voltage, the optical modulator receiving carrier light from a light source and modulating the carrier light according to the drive voltage to output modulated signal light. A terminating resistor for generating the drive voltage is connected between the first and second electrodes. A drive signal circuit is provided to generate a drive signal according to a data signal received. The drive signal is a current signal or a voltage signal corresponding to the drive voltage to be applied between the first and second electrodes of the optical modulator. The drive signal circuit and one of the first and second electrodes of the optical modulator are connected by a transmission line. A reflection rejecter for suppressing a reflected wave generating in the transmission line is provided on the transmission line.

It has become apparent that the tendency of the waveform degradation to the carrier light having large power is due to the reflected wave generating between the drive signal circuit and the optical modulator. According to the present invention, the reflection rejecter is provided on the transmission line, thereby allowing elimination of the reflected wave. As a result, waveform degradation in the signal light to be output from the optical modulator can be suppressed.

In accordance with another aspect of the present invention, there is provided an optical transmitter comprising a light source supplied with a bias current and outputting carrier light having power corresponding to the bias current; an optical modulator having first and second electrodes for receiving a drive voltage, the optical modulator receiving the carrier light and modulating the carrier light according to the drive voltage to output modulated signal light; a terminating resistor connected between the first and second electrodes, for generating the drive voltage; a transmission line having a first end and a second end, the first end being connected to one of the first and second electrodes; a drive signal circuit connected to the second end of the transmission line, for generating a drive signal corresponding to the drive voltage according to a data signal received; and a reflection rejecter provided on the transmission line, for suppressing a reflected wave generating in the transmission line.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the attached drawings.

Figure 1:
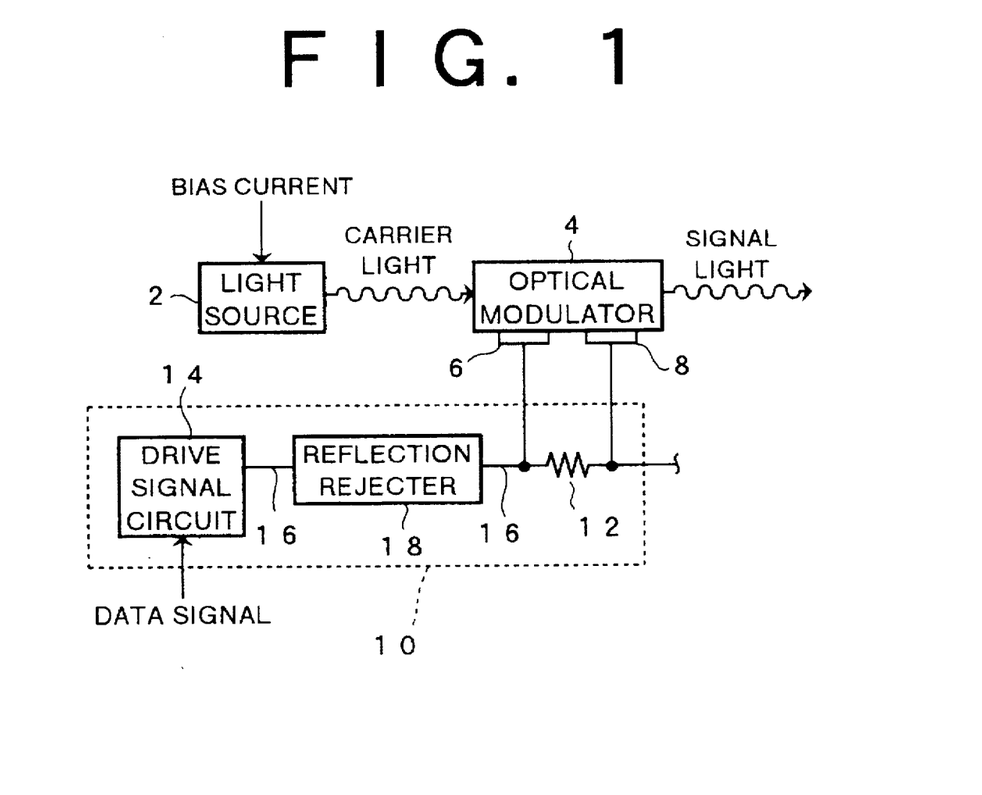
FIG. 1 is a block diagram showing the basic configuration of the present invention.

FIG. 1 is a block diagram showing the basic configuration of an optical transmitter according to the present invention. This configuration includes a drive circuit for an optical modulator according to the present invention.

A light source 2 is supplied with a bias current to output carrier light having power corresponding to the bias current. An optical modulator 4 has electrodes 6 and 8 for receiving a drive voltage. The optical modulator 4 receives the carrier light from the light source 2 to modulate the carrier light according to the drive voltage applied and output modulated signal light.

A drive circuit 10 for the optical modulator 4 includes a terminating resistor 12 connected between the electrodes 6 and 8 to generate the drive voltage. The drive circuit 10 further includes a drive signal circuit 14 for generating a drive signal corresponding to the drive voltage according to a data signal, a transmission line 16 for connecting the drive signal circuit 14 to either the electrode 6 or 8 (in FIG. 1, the electrode 6), and a reflection rejecter 18 provided on the transmission line 16. Preferred embodiments of the reflection rejecter 18 will be hereinafter described.

Figure 2:
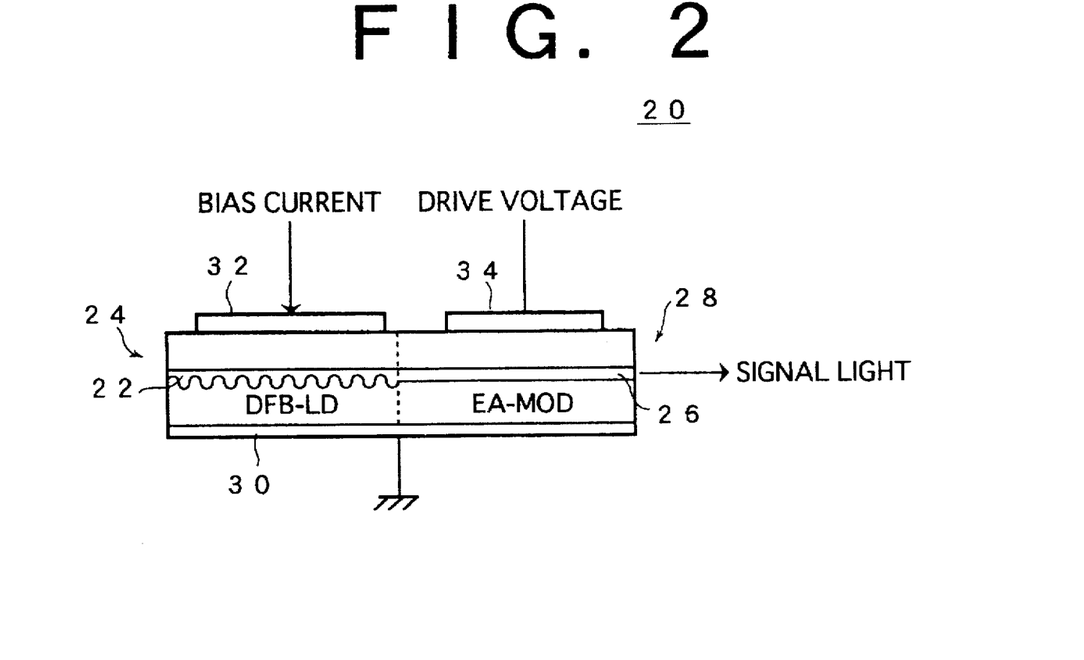
FIG. 2 is a view showing the configuration of a modulator-integrated DFB laser diode (MI-DFB)

FIG. 2 is a view showing the configuration of a modulator-integrated DFB laser diode (MI-DFB) 20 applicable to the present invention. The MI-DFB 20 is provided as a semiconductor chip having a direct-coupled waveguide structure including a multiquantum well (MQW) layer of GaInAs, for example. In the embodiment shown in FIG. 2, the MI-DFB 20 has a distributed feedback (DFB) type of laser diode 24 having an active layer 22 for generating carrier light and an electro-absorption type of optical modulator (EA modulator) 28 having an absorbing layer 26. The laser diode 24 and the EA modulator 28 are integrated with each other. The active layer 22 and the absorbing layer 26 are coupled monolithically. Reference numeral 30 denotes an electrode common for the laser diode 24 and the EA modulator 28. The electrode 30 is grounded, for example. The laser diode 24 has an electrode 32 for receiving a bias current, and the EA modulator 28 has an electrode 34 to which a drive voltage is applied.

Since the MI-DFB 20 has the active layer 24 and the absorbing layer 26 coupled monolithically, the carrier light generated from the active layer 22 can be efficiently introduced into the absorbing layer 26. Accordingly, the bias current to the laser diode 24 can be suppressed to reduce power consumption. Further, since the light source 2 and the optical modulator 4 shown in FIG. 1 can be provided as a single minute semiconductor chip, the optical transmitter can be reduced in size.

Figure 3:
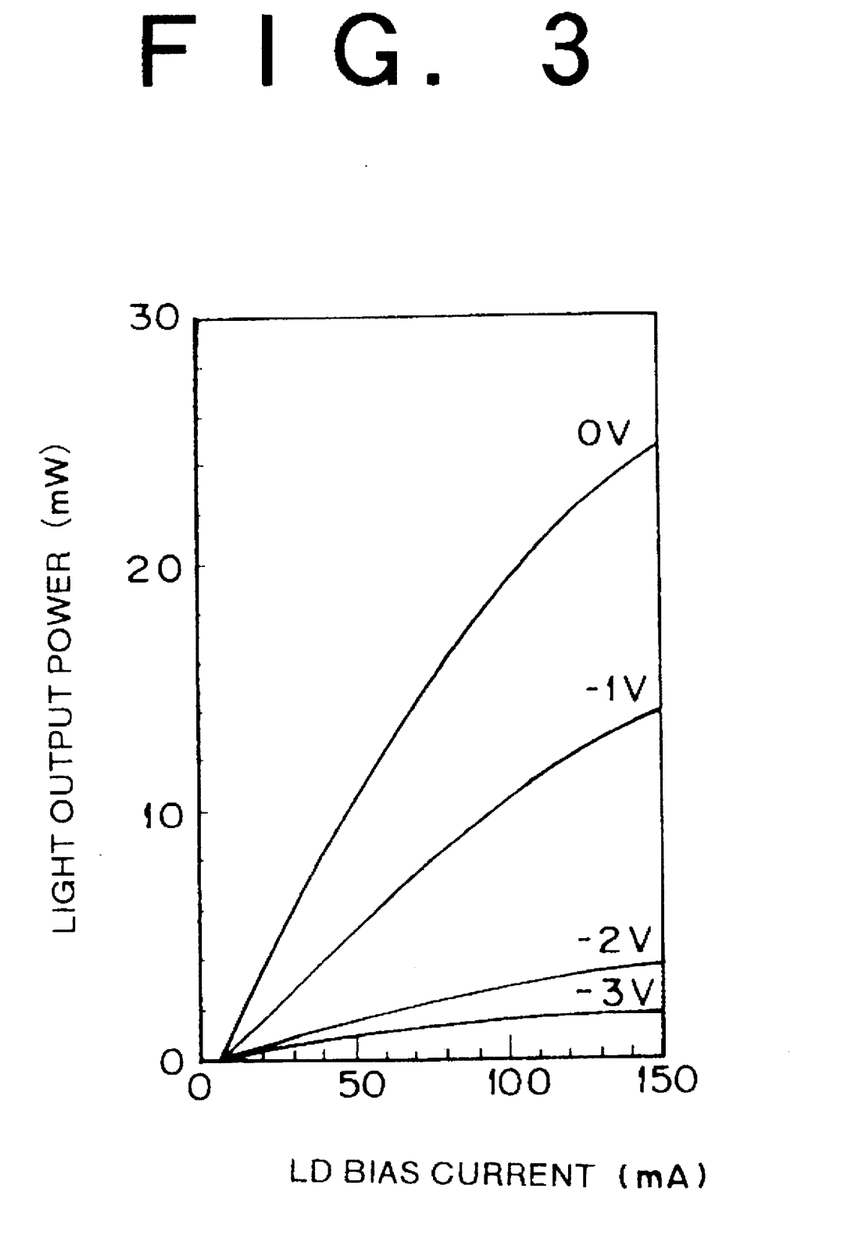
FIG. 3 is a graph showing an example of static characteristics of the MI-DFB.

FIG. 3 is a graph showing an example of static characteristics of the MI-DFB 20 shown in FIG. 2. In FIG. 3, the vertical axis represents the power of light output from the EA modulator 28, and the horizontal axis represents the bias current to the laser diode 24. The static characteristics shown are those when the electrode 30 is grounded and the potential of the electrode 34 is set to 0 V, −1 V, −2 V, and −3 V. It is understood from the static characteristics shown that an optical pulse waveform with an extinction ratio of about 11 dB can be obtained by driving the EA modulator 28 by a pulse waveform with a high level of 0 V and a low level of −3 V, for example.

Figure 4:
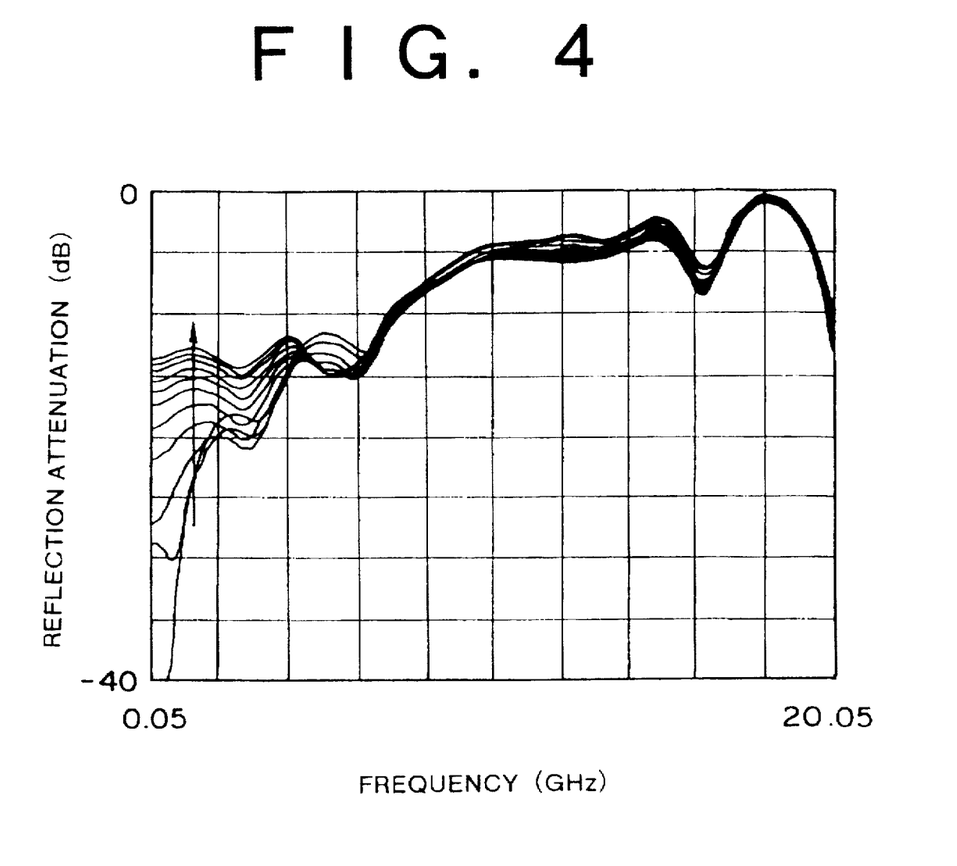
FIG. 4 is a graph showing a frequency characteristic of return loss of a drive signal.

FIG. 4 is a graph showing the frequency characteristic of return loss (reflection attenuation) of the drive signal in driving the MI-DFB 20 shown in FIG. 2. In FIG. 4, the vertical axis represents the return loss (dB), and the horizontal axis represents modulation frequency (GHz). The power of carrier light introduced into the EA modulator 28 increases in the direction shown by the arrow in the graph. The characteristic shown in FIG. 4 indicates that the reflection attenuation especially in a low-frequency band decreases with an increase in power of the carrier light. This means that if the reflection rejecter 18 is absent in the configuration of FIG. 1, the increase in power of the carrier light causes a problem such that a reflected wave of the drive signal is returned through the transmission line 16 to the drive signal circuit 14 to degrade a drive waveform.

The principle of operation of an electro-absorption type of optical modulator is in accordance with a so-called Franz-Keldysh effect such that an absorption band end changes with an applied electric field. When the power of carrier light introduced into the optical modulator increases, the quantity of light absorbed increases to cause an increase in photocurrent by the absorption. The increase in photocurrent changes an input impedance of the optical modulator, causing mismatching in impedance between the drive signal circuit and the optical modulator. The above-mentioned degradation of the drive waveform is considered to be due to the influence of the reflected wave by the mismatching in impedance.

Figure 5A:
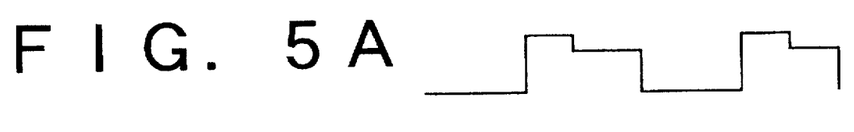
FIGS. 5A and 5B are illustrations of improvement in waveform according to the present invention.
Figure 5B:
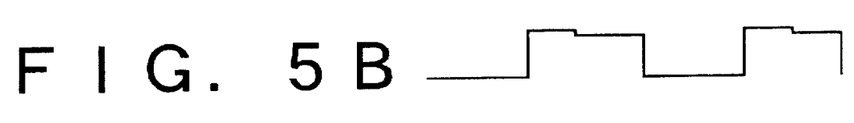

The degradation of the drive waveform can be regarded as superposition of the reflected wave on the waveform of the drive signal as shown in FIG. 5A. According to the present invention, the reflection rejecter 18 is provided on the transmission line 16 connecting the drive signal circuit 14 and the optical modulator 4, so that the reflected wave can be removed to thereby improve the drive waveform as shown in FIG. 5B.

While the reflection rejecter 18 may be provided on the way of the transmission line 16, the reflection rejecter 18 is provided preferably in the vicinity of the optical modulator 4 in considering the wiring work for the transmission line 16 between the drive signal circuit 14 and the optical modulator 4.

Figure 6:
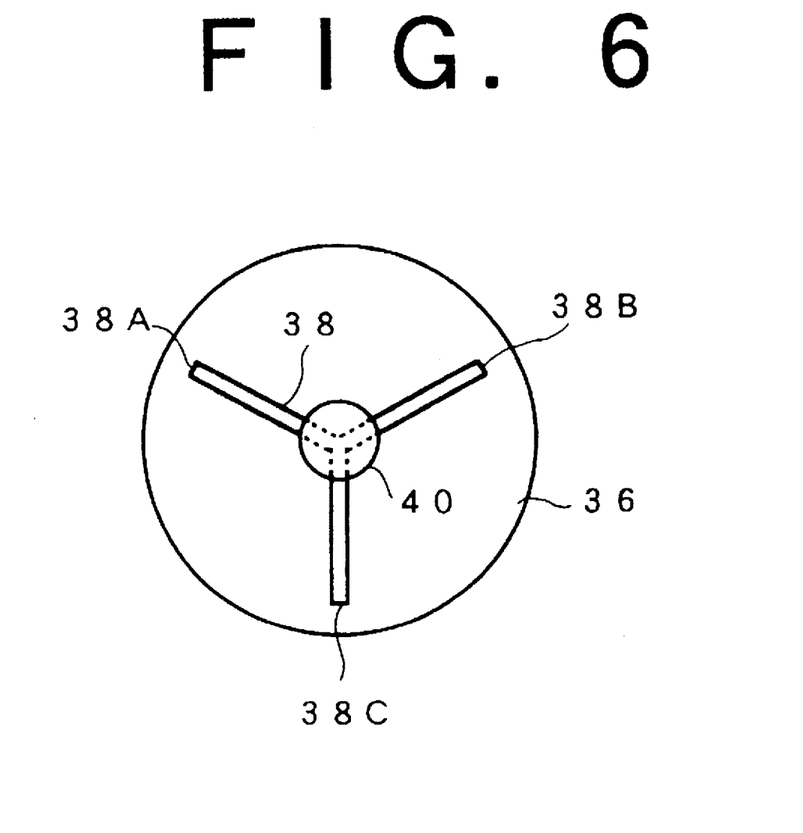
FIG. 6 is a plan view of a circulator applicable to the present invention.

FIG. 6 is a plan view of a circulator that can be used as the reflection rejecter 18 shown in FIG. 1. A Y-shaped microstrip line 38 is formed on a dielectric substrate 36. A magnetic material 40 such as ferrite magnetized is provided at a cross portion of the microstrip line 38. Three end portions of the microstrip line 38 serve as ports 38A, 38B, and 38C. A signal supplied to the port 38A is output from the port 38B only; a signal supplied to the port 38B is output from the port 38C only; and a signal supplied to the port 38C is output from the port 38A only. Accordingly, this circulator can be used as an isolator by selecting any two of the ports 38A, 38B, and 38C and terminating the remaining one port. For example, when the ports 38A and 38B are selected, the port 38A is connected to the drive signal circuit 14 and the port 38B is connected to the electrode 6 of the optical modulator 4.

By using such a circulator or isolator as the reflection rejecter 18 shown in FIG. 1, the reflected wave generated in the transmission line 16 can be removed to thereby eliminate waveform degradation to the carrier light having large power.

Figure 7:
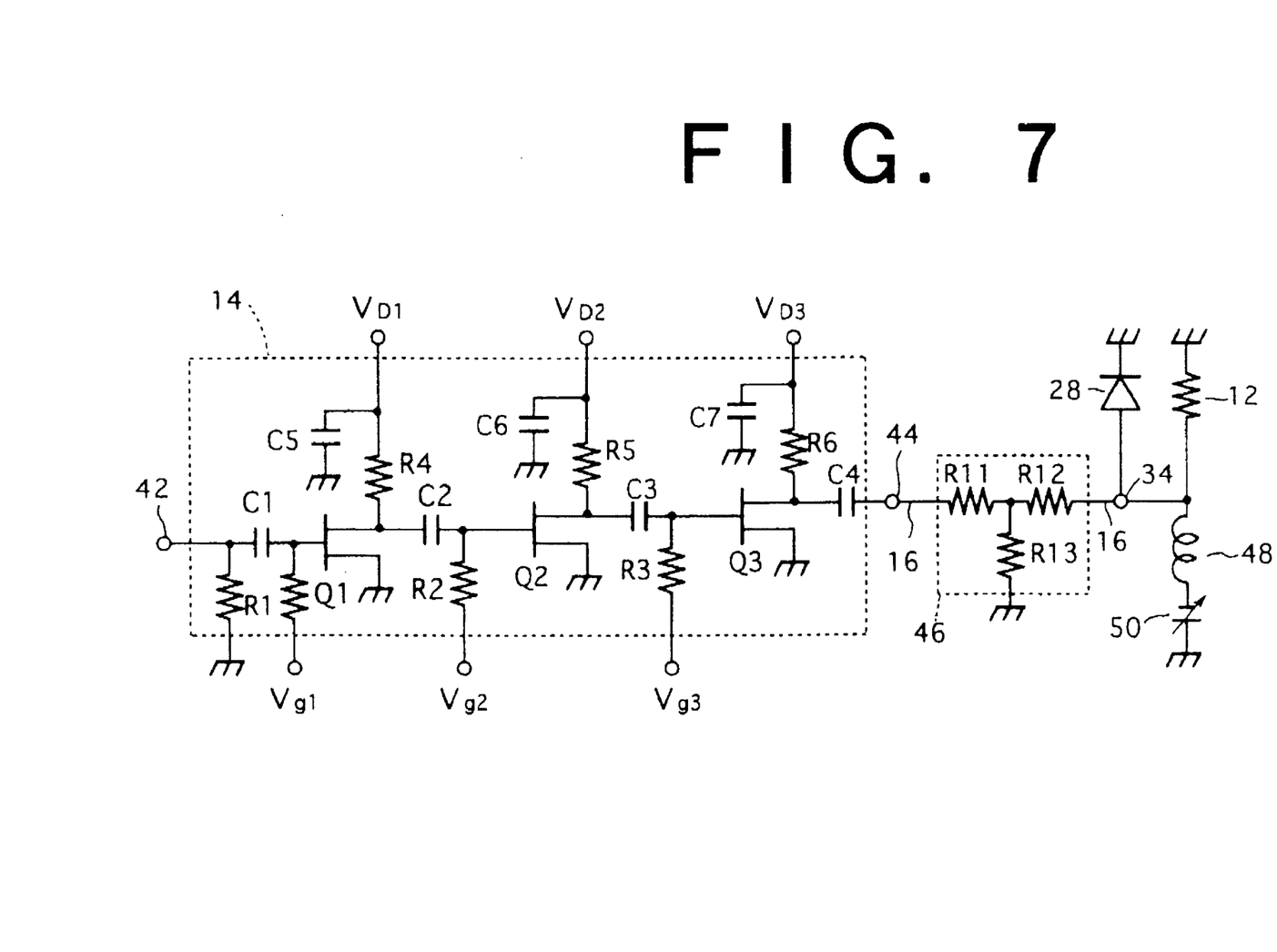
FIG. 7 is a circuit diagram showing a first preferred embodiment of the drive circuit according to the present invention.

FIG. 7 is a circuit diagram showing a first preferred embodiment of the drive circuit according to the present invention. In this preferred embodiment, the EA modulator 28 of the MI-DFB 20 shown in FIG. 2 is used as the optical modulator to be driven. However, the optical modulator to be driven in the present invention is not limited to the EA modulator 28. That is, the present invention can be applied also to an independent EA modulator or any other optical modulators. The electrodes 34 and 30 shown in FIG. 2 correspond to the electrodes 6 and 8 shown in FIG. 1, respectively, and the electrode 30 is grounded as shown in FIG. 2. The EA modulator 28 has diode characteristics from an electrical point of view.

Referring to FIG. 7, a data signal supplied to a port 42 is amplified by a three-stage drive signal circuit 14 having three FETs (field-effect transistors) Q1, Q2, and Q3, and is output as a drive signal from a port 44. The port 44 is connected to the electrode 34 of the EA modulator 28 by a transmission line 16 such as a microstrip line. An attenuator 46 as the reflection rejecter 18 is provided on the way of the transmission line 16. In this preferred embodiment, the attenuator 46 is formed by a T-shaped network. The electrode 34 is grounded through a terminating resistor 12. The terminating resistor 12 has a resistance of 50Ω, for example, in accordance with the characteristic impedance of the transmission line 16. A negative bias is applied from a variable voltage source 50 through an inductor 48 to the electrode 34 of the EA modulator 28.

In the drive signal circuit 14, the port 42 and the FET Q1 are AC-coupled by a capacitor C1; the FET Q1 and FET Q2 are AC-coupled by a capacitor C2; the FET Q2 and the FET Q3 are AC-coupled by a capacitor C3; and FET Q3 and the port 44 are AC-coupled by a capacitor C4. Gate voltages Vg1, Vg2, and Vg3 are applied through resistors R1, R2, and R3 to the gates of the FETs Q1, Q2, and Q3, respectively. Drain voltages VD1, VD2, VD3 are applied through resistors R4, R5, and R6 to the drains of the FETs Q1, Q2, and Q3, respectively. The sources of the FETs Q1, Q2, and Q3 are grounded. Reference symbols C5, C6, and C7 denote capacitors for high-frequency grounding the drains of the FETs Q1, Q2, and Q3.

The attenuator 46 has serially connected resistors R11 and R12 provided on the way of the transmission line 16 and a resistor R13 for grounding a connection point between the resistors R11 and R12. Letting R denote the characteristic impedance of the transmission line 16 and K denote the reciprocal of an attenuation factor to be obtained, the resistance value of the resistors R11 and R12 is given by $R(K-1)/(K+1)$, and the resistance value of the resistor R13 is given by $2RK/(K^2-1)$. For example, when the characteristic impedance R is 50Ω and an attenuation of −6 dB (K=2) is required, the resistance value of the resistors R11 and R12 becomes 16.7Ω and the resistance value of the resistor R13 becomes 66.7Ω.

Now, letting V1 (V) denote the optimum drive amplitude to the EA modulator 28 and −X dB (0<X) denote the attenuation in the attenuator 46, the amplitude of an output from the drive signal circuit 14 is given by $V1/10^{-X/20}$. Assuming that the reflection attenuation of an output from the drive signal circuit 14 is 0 dB and the reflection attenuation of an input to the EA modulator 28 is −10 dB in terms of electric power in the case where the attenuator 46 is absent, 10% of signal power to be input to the EA modulator 28 is reflected and all the reflected power is reflected again in the drive signal circuit 14 to cause the degradation of drive waveform (see FIG. 5A).

In the case that the attenuator 46 is provided on the way of the transmission line 16 as in this preferred embodiment, and the attenuation in the attenuator 46 is −6 dB, for example, the reflected wave passes through the attenuator 46 at least twice, thereby suppressing the influence of the reflected wave down to 2.5% or less (see FIG. 5B). In this manner, according to this preferred embodiment, even when the bias current to the laser diode 24 shown in FIG. 2 is increased to increase the power of carrier light, the degradation of the waveform of a light output due to the influence of the reflected wave can be suppressed.

A circuit for supplying the bias current to the laser diode 24 can be easily fabricated as usual, so that the description thereof will be omitted herein.

In this preferred embodiment, the attenuator 46 is used as the reflection rejecter 18. Therefore, it is required to set the amplitude of an output from the drive signal circuit 14 to a relatively large value according to the attenuation factor of the attenuator. The setting of the output amplitude can be carried out by adjusting the drain voltage VD3 of the final-stage FET Q3.

In the case that the circulator or isolator as shown in FIG. 6 is used as the reflection rejecter, the amplitude of an output from the drive signal circuit 14 may be substantially the same as the optimum amplitude of a drive signal to the EA modulator 28.

Figure 8:
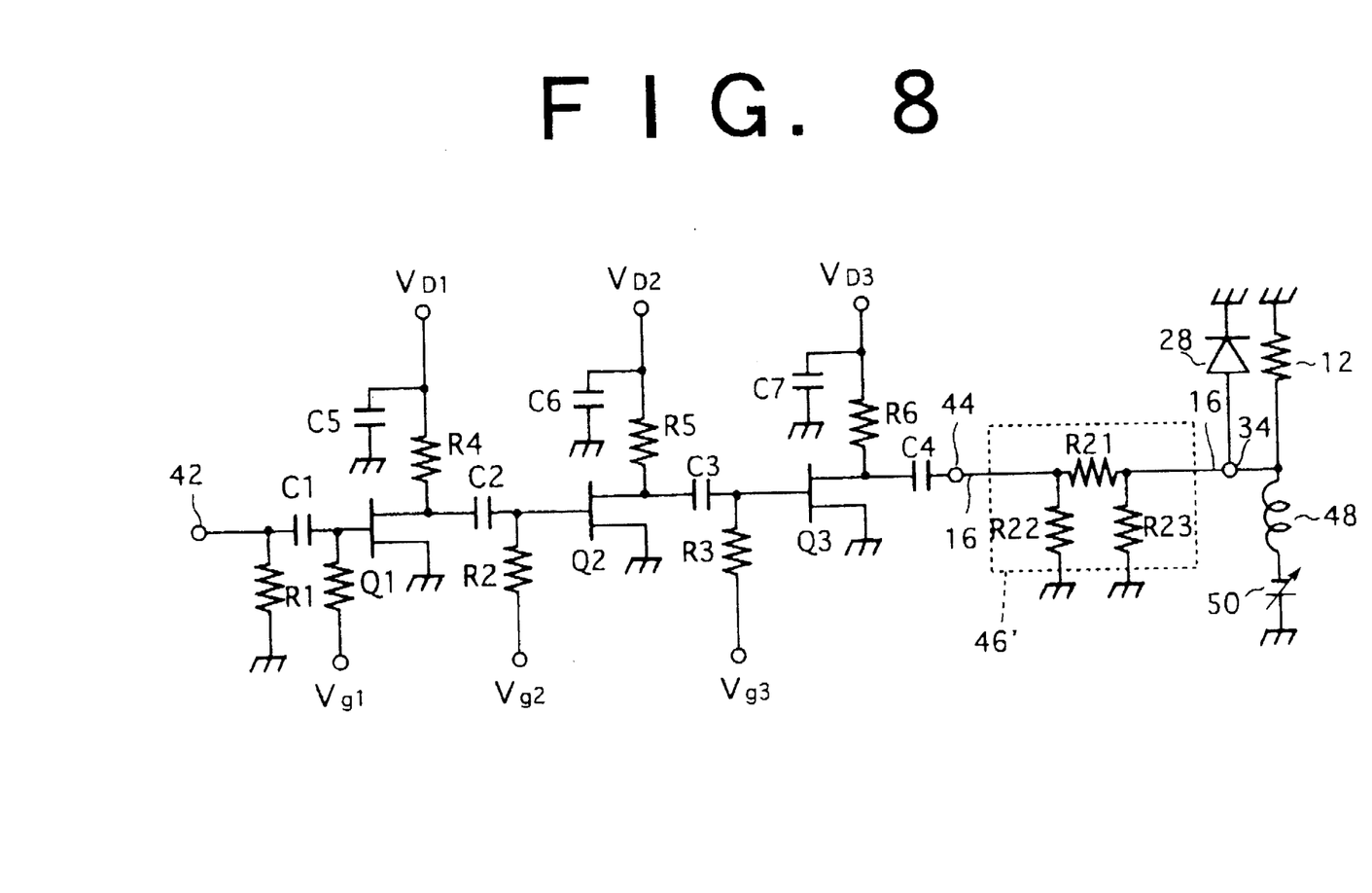
FIG. 8 is a circuit diagram showing a second preferred embodiment of the drive circuit according to the present invention.

FIG. 8 is a circuit diagram showing a second preferred embodiment of the drive circuit according to the present invention. In this preferred embodiment, an attenuator 46' formed by a π-shaped network is used as the reflection rejecter. The attenuator 46' has a resistor R21 provided on the way of a transmission line 16 and resistors R22 and R23 for grounding both ends of the resistor R21. Letting R denote the characteristic impedance of the transmission line 16 and K denote the reciprocal of an attenuation factor to be obtained, the resistance value of the resistor R21 is given by $R(K^2-1)/2K$ and the resistance value of the resistors R22 and R23 is given by $R(K+1)/(K-1)$. Also according to this preferred embodiment, the waveform degradation due to the influence of the reflected wave when the power of carrier light is large can be suppressed.

Figure 9:
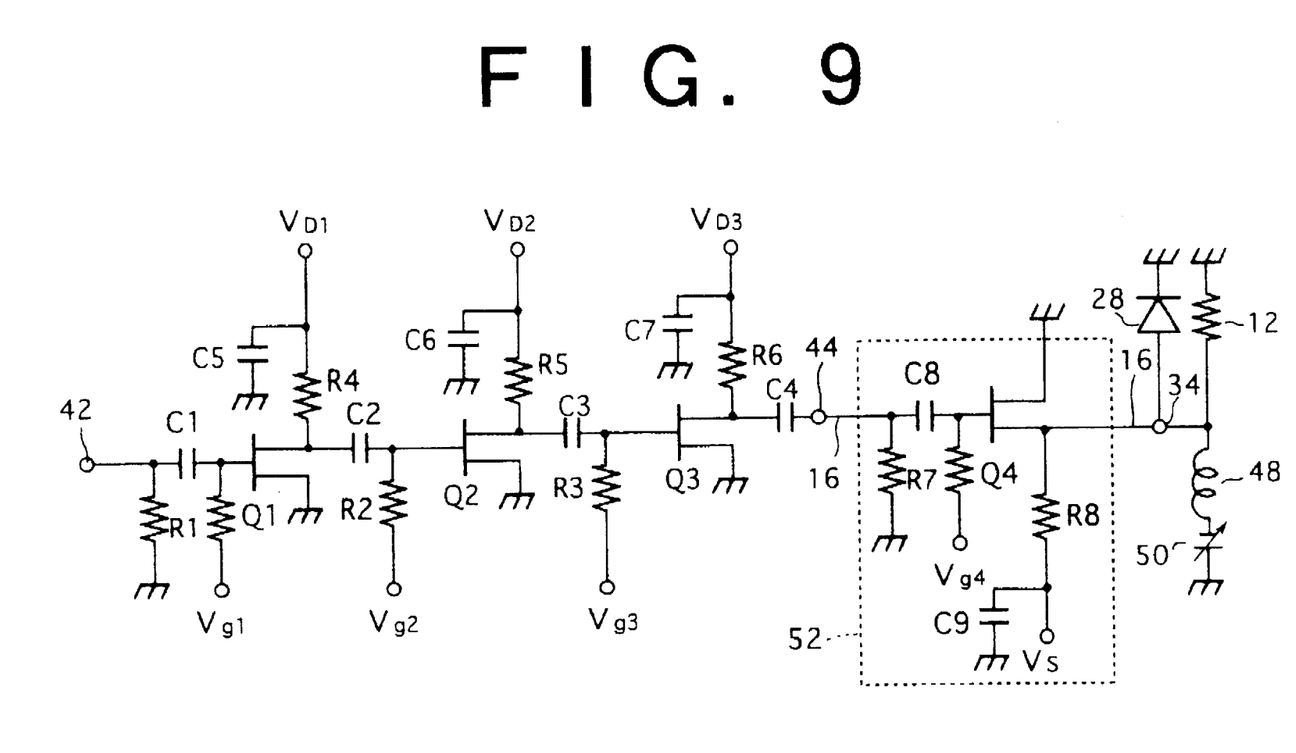
FIG. 9 is a circuit diagram showing a third preferred embodiment of the drive circuit according to the present invention.

FIG. 9 is a circuit diagram showing a third preferred embodiment of the drive circuit according to the present invention. This preferred embodiment is characterized in that a buffer circuit 52 is provided on the way of a transmission line 16. The buffer circuit 52 has a fourth FET Q3. A gate voltage Vg4 is applied through a resistor R7 to the gate of the FET Q4, and a source voltage Vs is applied through a resistor R8 to the source of the FET Q4. The drain of the FET Q4 is grounded. Reference symbol C8 denotes a capacitor for AC-connecting a port 44 and the gate of the FET Q4, and reference symbol C9 denotes a capacitor for high-frequency grounding the source of the FET Q4.

The buffer circuit 52 is similar in function to an isolator. That is, a drive signal output from the port 44 gives a drive voltage to an EA modulator 28 without a change in amplitude, and a reflected wave from the EA modulator 28 has no influence upon the input of the buffer circuit 52. Accordingly, this preferred embodiment can also prevent the waveform degradation due to the reflected wave. In addition, unlike the first or second preferred embodiment using the attenuator as the reflection rejecter, it is unnecessary to set an large output amplitude of the drive signal circuit. In modification, a buffer circuit having an emitter follower of a usual transistor may be adopted as the buffer circuit 52.

Figure 10:
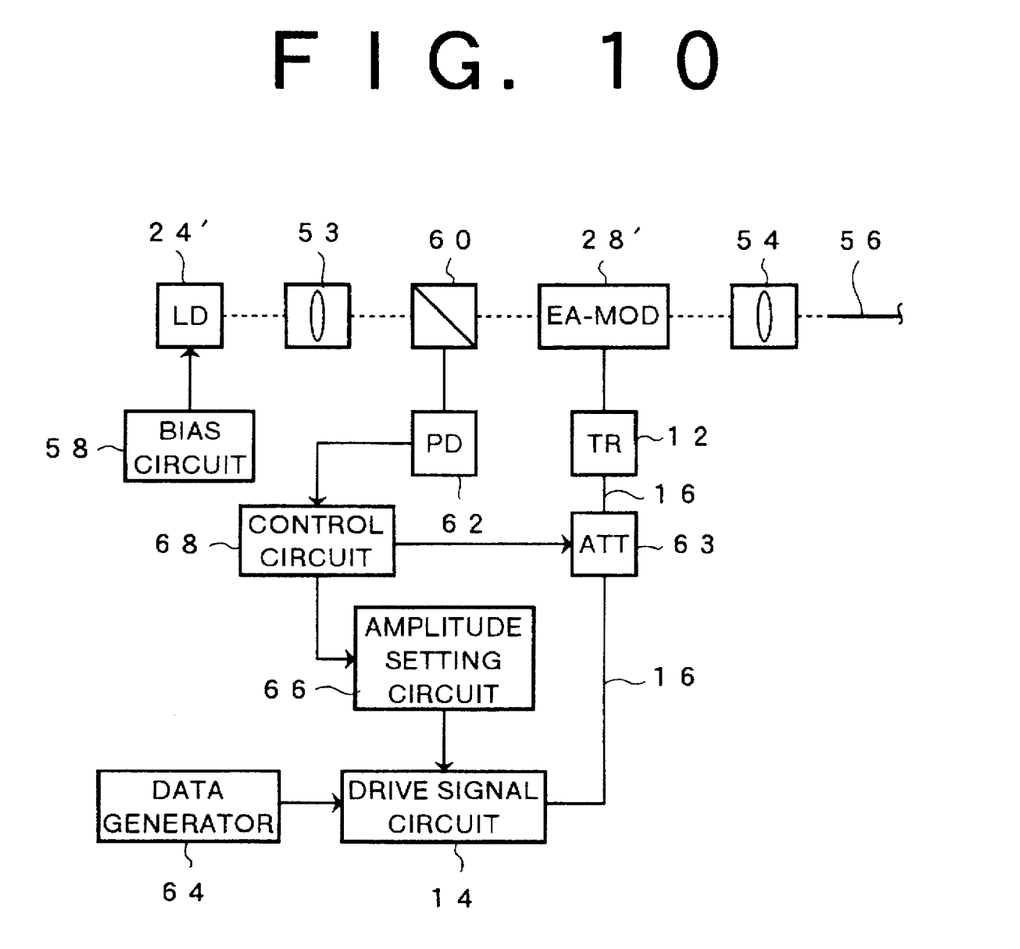
FIG. 10 is a block diagram showing a first preferred embodiment of the optical transmitter according to the present invention.

FIG. 10 is a block diagram showing a first preferred embodiment of the optical transmitter according to the present invention. In this preferred embodiment, a laser diode 24' and an EA modulator 28' independent of each other are used respectively as a light source and an optical modulator, so as to monitor the power of carrier light to be supplied to the optical modulator 28'. The carrier light emitted from the laser diode 24' is introduced into the EA modulator 28' by an optical system 53 having a lens. Signal light output from the EA modulator 28' is introduced into an optical fiber transmission line 56 by an optical system 54 having a lens.

A bias current is supplied from a bias circuit 58 to the laser diode 24', thereby generating the carrier light having constant power. Although not shown, a feedback loop for detecting the power of backward light from the laser diode 24' and setting the power detected to a constant value may be provided, so as to prevent fluctuations in the power of the carrier light due to a temperature change or the like of the laser diode 24'.

To monitor the power of the carrier light to be supplied from the laser diode 24' to the EA modulator 28', the carrier light is branched into two parts by a light branching device 60, and one of the two parts is input into a photodetector 62. The photodetector 62 outputs a signal corresponding to the power of the branch light received from the device 60.

An attenuator 63 as the reflection rejecter is provided on the way or at an end portion of a transmission line 16. The attenuator 63 has a variable attenuation factor. A data signal to be input into a drive signal circuit 14 is generated in a data generator 64. An amplitude setting circuit 66 is provided to change the amplitude of a drive signal to be output from the drive signal circuit 14. A control circuit 68 receives the signal from the photodetector 62 to control the attenuation factor of the attenuator 63 and the amplitude of the drive signal according to the monitored power of the carrier light.

Particularly in this preferred embodiment, the control circuit 68 controls to increase the attenuation factor of the attenuator 63 and the amplitude of the drive signal with an increase in the detected power of the carrier light. Increasing the attenuation factor means increasing X in attenuation of $-X$ dB ($0<X$). In the case that the drive signal circuit 14 has a three-stage amplifier as shown in FIG. 7, the amplitude setting circuit 66 changes the drain voltage VD3 of the FET Q3. The attenuator 63 having the variable attenuation factor can be easily constructed, for example, by a plurality of attenuators different in attenuation factor and an electrical or mechanical switch for switching these attenuators.

When the power of the carrier light to be supplied to the EA modulator 28' is small and the reflected wave of the drive signal is hardly generated, the control circuit 68 controls to set the attenuation in the attenuator 63 to 0 dB and set the amplitude of an output from the drive signal circuit 14 to an optimum amplitude V1 of the drive signal to the EA modulator 28'. On the other hand, when the power of the carrier light is large and the waveform degradation due to the reflected wave of the drive signal is generated, the control circuit 68 controls to set the attenuation in the attenuator 63 to $-X$ dB which is enough to suppress the reflected wave and increase the gain in the drive signal circuit 14 so that the amplitude of the output from the drive signal circuit 14 is increased by X dB to obtain the optimum amplitude V1 of the drive signal to the EA modulator 28'.

While the control circuit 68 is configured so as to switch the above-mentioned two states in this preferred embodiment, it may be configured so as to continuously change the attenuation factor and the amplitude. For example, input reflection attenuation in the EA modulator 28' in association with a change in the power of the carrier light may be preliminarily measured to prepare a map using the power of the carrier light and the input reflection attenuation as parameters. Then, the attenuation factor in the attenuator 63 may be controlled so as to compensate for the degradation of the input reflection attenuation, and the amplitude of the drive signal may be controlled so as to cancel the attenuation factor.

According to this preferred embodiment, when the power of the carrier light is small and there is no possibility of waveform degradation due to the influence of a reflected wave, the amplitude of the drive signal is controlled to become small. Accordingly, the power consumption in the drive signal circuit 14 can be suppressed.

Figure 11:
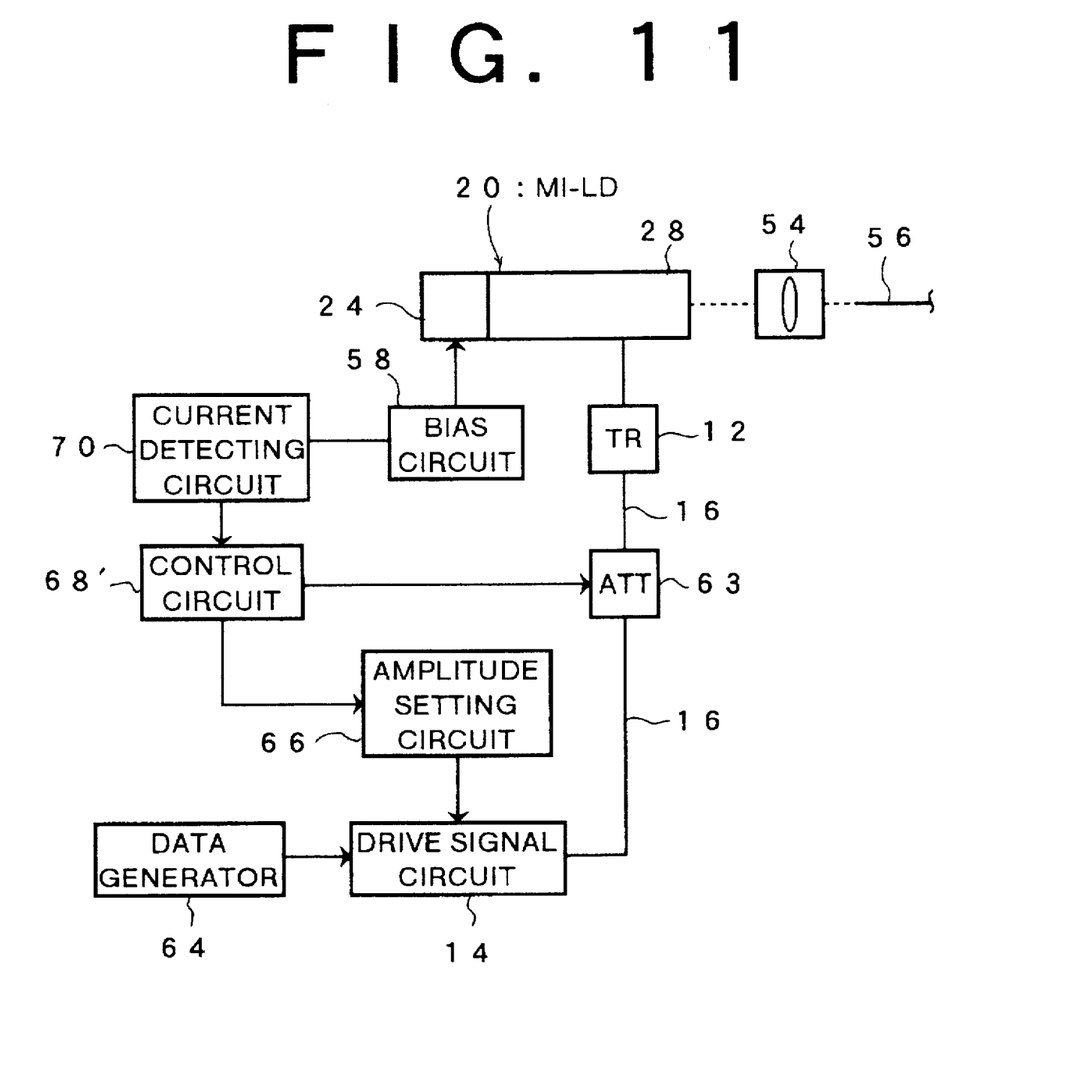
FIG. 11 is a block diagram showing a second preferred embodiment of the optical transmitter according to the present invention.

FIG. 11 is a block diagram showing a second preferred embodiment of the optical transmitter according to the present invention. In contrast to the preferred embodiment shown in FIG. 10, the second preferred embodiment is characterized in that the MI-DFB 20 having an integrated light source and optical modulator shown in FIG. 2 is used. The other characterized point in this preferred embodiment is that a current detecting circuit 70 detects a bias current to be supplied to the laser diode 24, so as to monitor the power of carrier light.

The current detecting circuit 70 has a resistor having a known resistance value through which the bias current flows, so that the value of the bias current can be measured by detecting a voltage drop in the resistor. That is, since the power of the carrier light generated from the laser diode 24 is determined by the bias current, the power of the carrier light can be monitored according to the detected value of the bias current. A control circuit 68' receives an output signal from the current detecting circuit 70 to perform control similar to that of the control circuit 68 shown in FIG. 10.

In this preferred embodiment, the optical system 63, the light branching device 60, and the photodetector 62 shown in FIG. 10 are unnecessary, so that the configuration can be made simple. Further, the use of the MI-DFB 20 allows a reduction in optical coupling loss between the light source and the optical modulator, thereby reducing the power consumption in the bias circuit 58. In the case that the light source and the optical modulator are directly coupled together as in this preferred embodiment, the quantity of carrier light absorbed in the optical modulator is large and the reflected wave of the drive signal therefore tends to be generated in the optical modulator. Accordingly, the effect of the present invention by the use of the reflection rejecter is very great.

While the attenuation factor in the attenuator and the amplitude of the drive signal are controlled to be increased with an increase in power of the carrier light in the above description with reference to FIGS. 10 and 11, the attenuation factor in the attenuator and the amplitude of the drive signal may be controlled to be decreased with an increase in power of the carrier light in an optical modulator having a frequency characteristic of reflection attenuation of a drive signal different from the frequency characteristic shown in FIG. 4.

Having thus described specific embodiments of the present invention, it is to be noted that the present invention is not limited to the above preferred embodiments. For example, the present invention is applicable also to any optical modulators other than the EA modulator. In the case that the impedance of an optical modulator changes with a change in power of the carrier light to be supplied to the optical modulator, an effect similar to that obtained in the above preferred embodiments can be obtained by application of the present invention. The scope of the present invention is defined in the appended claims, and all modifications and changes as fall within the equivalence of the scope of the claims are therefore to be embraced by the invention.

What is claimed is:

1. A drive circuit for an optical modulator having first and second electrodes for receiving a drive voltage, said optical modulator receiving carrier light from a light source and modulating said carrier light according to said drive voltage to output modulated signal light, said drive circuit comprising:

a terminating resistor connected between said first and second electrodes, for generating said drive voltage;

a transmission line having a first end and a second end, said first end being connected to one of said first and second electrodes;

a drive signal circuit connected to said second end of said transmission line, for generating a drive signal corresponding to said drive voltage according to a data signal received; and a reflection rejecter provided on said transmission line, for suppressing a reflected wave generating in said transmission line.

2. A drive circuit for an optical modulator according to claim 1, wherein said reflection rejecter comprises an attenuator.

3. A drive circuit for an optical modulator according to claim 1, wherein said reflection rejecter comprises an isolator.

4. A drive circuit for an optical modulator according to claim 1, wherein said reflection rejecter comprises a buffer circuit having a transistor.

5. A drive circuit for an optical modulator according to claim 1, wherein said reflection rejecter comprises an attenuator having a variable attenuation factor, said drive circuit further comprising:

a first means for monitoring power of said carrier light;

a second means for changing an amplitude of said drive signal; and a third means for controlling said attenuation factor and said ampltude according to said power monitored by said first means.

6. A drive circuit for an optical modulator according to claim 5, wherein said third means increases said attenuation factor and said amplitude with an increase in said monitored power.

7. A drive circuit for an optical modulator according to claim 5, wherein said first means comprises means for branching said carrier light into first branch light and second branch light, and a photodetector for receiving said first branch light and outputting a signal corresponding to power of said first branch light;

said second branch light being supplied to said optical modulator.

8. A drive circuit for an optical modulator according to claim 5, wherein said light source comprises a laser diode supplied with a bias current, and said first means comprises a means for detecting said bias current.

9. A drive circuit for an optical modulator according to claim 1, wherein said optical modulator comprises an electro-absorption type of optical modulator for outputting intensity-modulated signal light by absorbing said carrier light according to said drive voltage.

10. An optical transmitter comprising:

a light source supplied with a bias current and outputting carrier light having power corresponding to said bias current;

an optical modulator having first and second electrodes for receiving a drive voltage, said optical modulator receiving said carrier light and modulating said carrier light according to said drive voltage to output modulated signal light;

a terminating resistor connected between said first and second electrodes, for generating said drive voltage;

a transmission line having a first end and a second end, said first end being connected to one of said first and second electrodes;

a drive signal circuit connected to said second end of said transmission line, for generating a drive signal corresponding to said drive voltage according to a data signal received; and a reflection rejecter provided on said transmission line, for suppressing a reflected wave generating in said transmission line.

11. An optical transmitter according to claim 10, wherein:

said light source comprises a laser diode having an active layer for generating said carrier light; and said optical modulator comprises an electro-absorption type of optical modulator having an absorbing layer for absorbing said carrier light according to said drive voltage;

said absorbing layer being monolithically connected to said active layer.

12. An optical transmitter according to claim 11, wherein:

said reflection rejecter comprises an attenuator having a variable attenuation factor, said optical transmitter further comprising:

a means for detecting said bias current to thereby monitor the power of said carrier light; and a means for controlling said attenuation factor and an amplitude of said drive signal so that said attenuation factor and said amplitude increase with an increase in the power of said carrier light monitored.

* * * * *

UNITED STATES PATENT AND TRADEMARK OFFICE
CERTIFICATE OF CORRECTION

PATENT NO. : 5,706,116
DATED     : January 6, 1998
INVENTOR(S) : Akihiko SAGATA

It is certified that error appears in the above-identified patent and that said Letters Patent is hereby corrected as shown below:

On the title page, item [54] and column 1, line 1, after "CIRCUIT" insert --FOR--.

On the title page, item [75], change "Kawaski" to --Kawasaki--.

Signed and Sealed this

Fourteenth Day of April, 1998

Attest:

BRUCE LEHMAN

Attesting Officer

Commissioner of Patents and Trademarks